(12) United States Patent
Kusakawa et al.

(10) Patent No.: US 10,395,505 B2
(45) Date of Patent: Aug. 27, 2019

(54) COMMUNICATOR, ELECTRIC WORKING MACHINE, AND COMMUNICATION METHOD

(71) Applicant: MAKITA CORPORATION, Anjo-shi, Aichi (JP)

(72) Inventors: Takuya Kusakawa, Anjo (JP); Masaaki Fukumoto, Anjo (JP)

(73) Assignee: MAKITA CORPORATION, Anjo-shi (JP)

(*) Notice: Subject to any disclaimer, the term of this patent is extended or adjusted under 35 U.S.C. 154(b) by 0 days.

(21) Appl. No.: 16/006,338

(22) Filed: Jun. 12, 2018

(65) Prior Publication Data

US 2018/0365962 A1    Dec. 20, 2018

(30) Foreign Application Priority Data

Jun. 16, 2017    (JP) .................................. 2017-118753

(51) Int. Cl.
  *G08B 21/00*    (2006.01)
  *G08B 21/18*    (2006.01)
  (Continued)

(52) U.S. Cl.
  CPC ............. *G08B 21/18* (2013.01); *B23D 59/00* (2013.01); *B23Q 17/00* (2013.01); *B25F 5/00* (2013.01); *B28D 7/00* (2013.01); *G08C 17/02* (2013.01); *H04H 20/12* (2013.01); *H04H 20/16* (2013.01); *H04H 20/57* (2013.01); *H04H 20/61* (2013.01); *H04L 12/2809* (2013.01); *H04L 67/12* (2013.01); *H04W 4/06* (2013.01); *H04W 60/04* (2013.01); *B23D 59/001* (2013.01); *B23D 59/006* (2013.01); *G08B 5/36* (2013.01); *H04L 2012/2841* (2013.01); *H04W 4/70* (2018.02)

(58) Field of Classification Search
  CPC ...................................................... G08B 21/18
  USPC .............. 340/680, 665, 679, 435, 436, 438, 340/539.13, 540, 541
  See application file for complete search history.

(56) References Cited

U.S. PATENT DOCUMENTS

| 6,917,300 | B2 * | 7/2005 | Allen | ........................ G08G 1/20 340/539.13 |
| 6,963,278 | B2 * | 11/2005 | Frame | ................... B66C 15/045 340/539.22 |

(Continued)

FOREIGN PATENT DOCUMENTS

EP    2628431 A2    8/2013

OTHER PUBLICATIONS

Sep. 27, 2018 European Search Report issued in European Patent Application No. 18177471.2.

*Primary Examiner* — Tai T Nguyen
(74) *Attorney, Agent, or Firm* — Oliff PLC

(57) ABSTRACT

A communicator in one aspect of the present disclosure includes a connector, a communication circuit, and a communication controller. The connector is electrically coupled to an electric working machine. The communication circuit performs wireless communication. The communication controller cyclically transmits operational information without specifying a recipient via the communication circuit in response to an operating mode of the communication controller being set to an operation-transmission mode. The operational information indicates an operating state of the electric working machine.

33 Claims, 8 Drawing Sheets

(51) Int. Cl.

| | | |
|---|---|---|
| *B25F 5/00* | (2006.01) | |
| *B23D 59/00* | (2006.01) | |
| *B28D 7/00* | (2006.01) | |
| *G08C 17/02* | (2006.01) | |
| *H04H 20/12* | (2008.01) | |
| *H04H 20/16* | (2008.01) | |
| *H04H 20/57* | (2008.01) | |
| *H04H 20/61* | (2008.01) | |
| *H04L 12/28* | (2006.01) | |
| *H04W 4/06* | (2009.01) | |
| *H04W 60/04* | (2009.01) | |
| *H04L 29/08* | (2006.01) | |
| *B23Q 17/00* | (2006.01) | |
| *H04W 4/70* | (2018.01) | |
| *G08B 5/36* | (2006.01) | |

(56) References Cited

U.S. PATENT DOCUMENTS

| | | | |
|---|---|---|---|
| 7,167,082 B2* | 1/2007 | Stigall | A41D 13/00 340/407.1 |
| 8,760,289 B2* | 6/2014 | Leppanen | B66C 15/06 340/435 |
| 2003/0037466 A1* | 2/2003 | Komatsu | E02F 9/20 37/348 |
| 2016/0325391 A1 | 11/2016 | Stampfl et al. | |
| 2016/0373457 A1 | 12/2016 | Matson et al. | |
| 2017/0217429 A1* | 8/2017 | Shioe | B60R 11/04 |

\* cited by examiner

FIG. 4
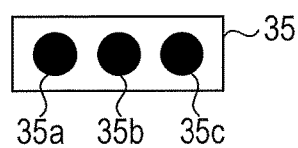
 : ALL-OFF
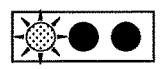 : FIRST-LED FLASH
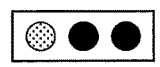 : FIRST-LED ON
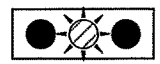 : SECOND-LED FLASH
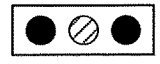 : SECOND-LED ON
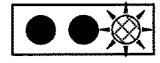 : THIRD-LED FLASH
 : THIRD-LED ON

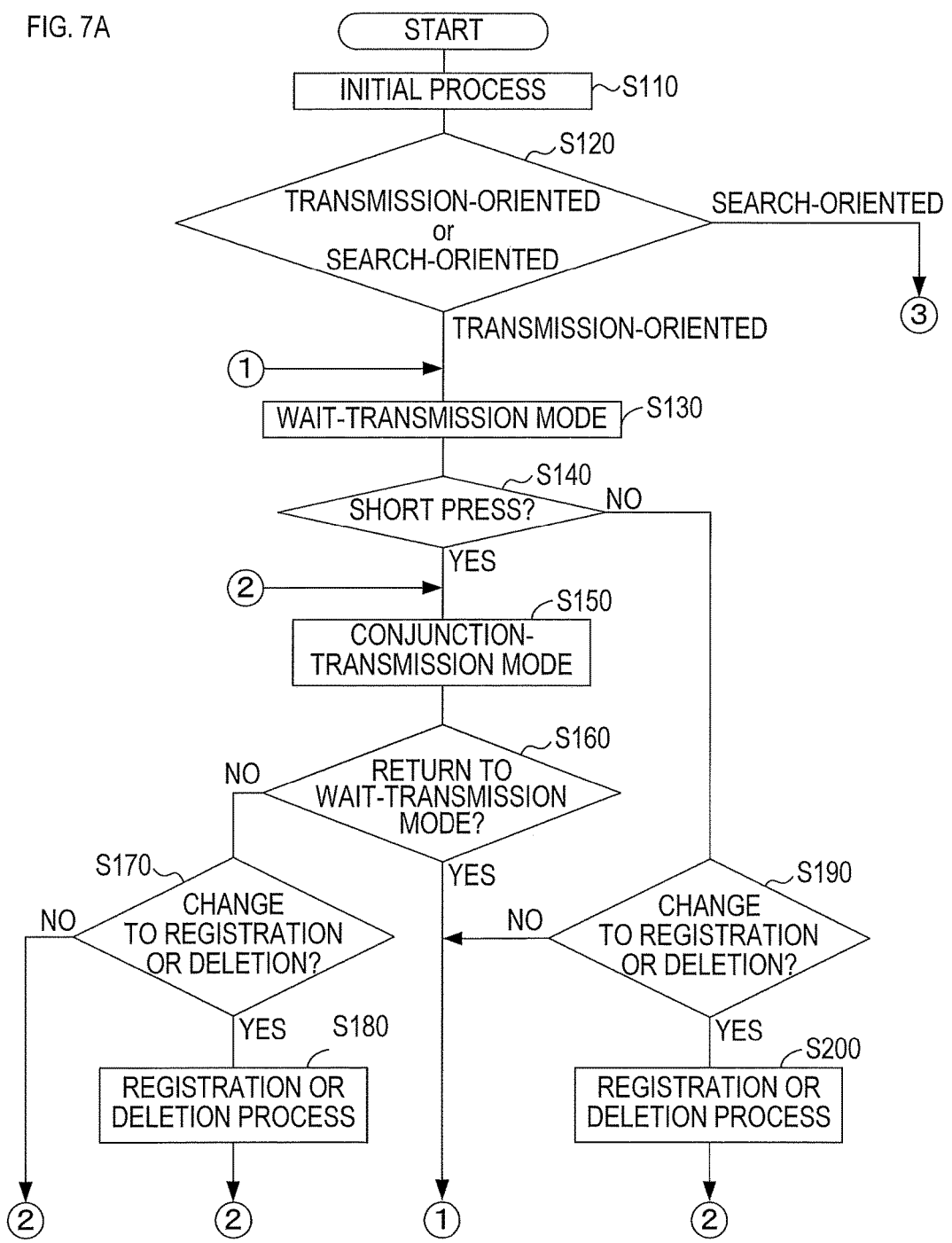

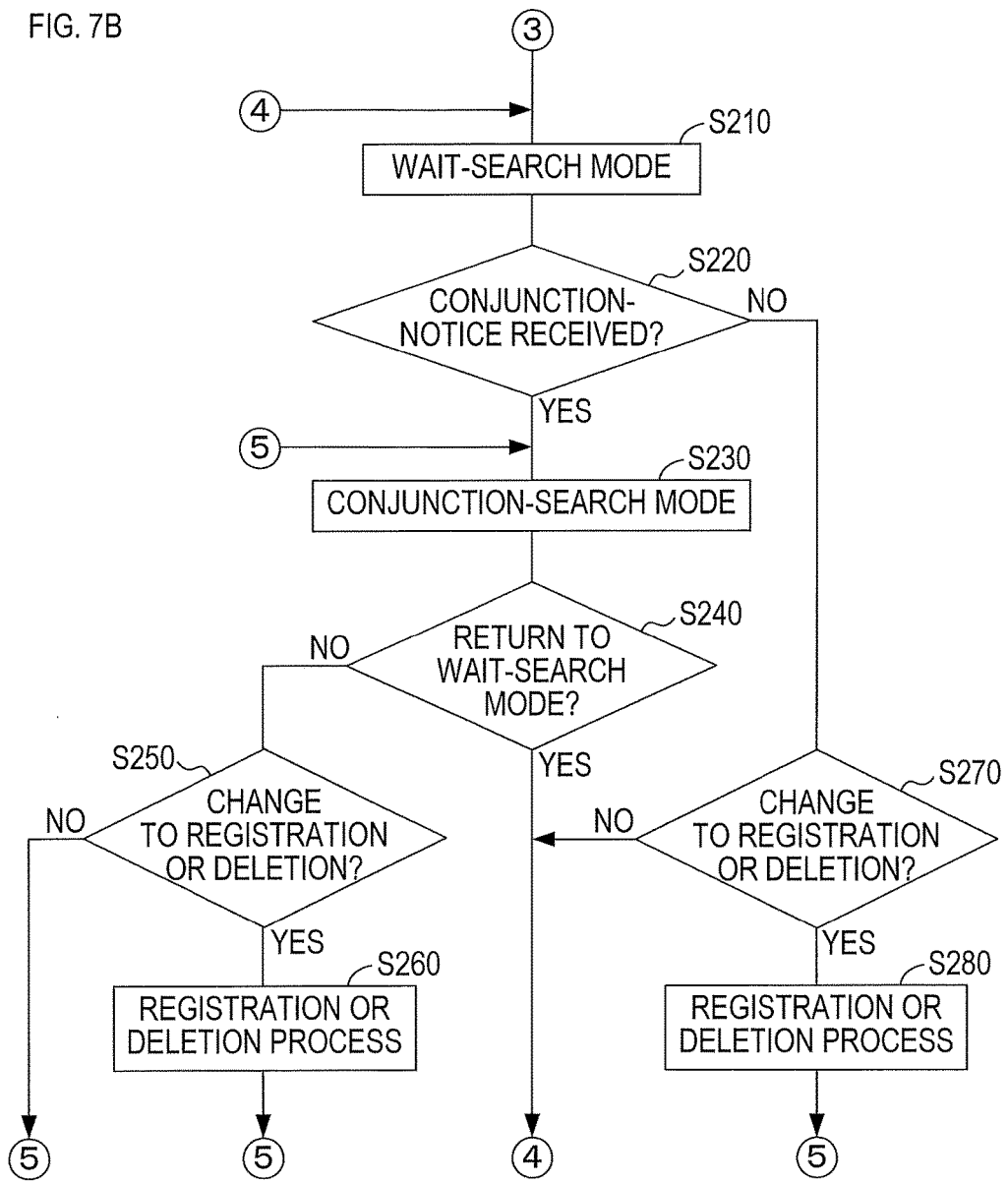

COMMUNICATOR, ELECTRIC WORKING MACHINE, AND COMMUNICATION METHOD

CROSS-REFERENCE TO RELATED APPLICATIONS

This application claims the benefit of Japanese Patent Application No. 2017-118753 filed Jun. 16, 2017 in the Japan Patent Office, the disclosure of which is incorporated herein by reference.

BACKGROUND

The present disclosure relates to a wireless communication technique for an electric working machine.

EP 2628431 discloses a technique to equip a machine tool and a dust collector with a communication tool and operate the machine tool in conjunction with the dust collector through communication between their own communication tools.

SUMMARY

When different electric working machines communicate with each other through their own communication tools, such communication is generally conducted on one-on-one basis only between a first electric working machine and a second electric working machine. In other words, the first electric working machine generally specifies the second electric working machine and communicates with the second electric working machine to achieve the conjunctive operation with the second electric working machine.

Nevertheless, the first electric working machine that is designed for conjunctive operation with only the second electric working machine is not always useful for a user. For example, the user may also prefer operating two or more additional electric working machines in conjunction with the first electric working machine in addition to the second electric working machine.

Preferably, one aspect of the present disclosure can improve usefulness of an electric working machine.

A communicator in one aspect of the present disclosure includes a connector, a communication circuit, and a communication controller. The connector is configured to be electrically coupled to a transmission side electric working machine. The communication circuit is configured to perform wireless communication. The communication controller is configured such that its operating mode is settable to an operation-transmission mode in response to the connector being coupled to the transmission side electric working machine. The communication controller is further configured to cyclically transmit operational information via the communication circuit without specifying a recipient in response to the operating mode being set to the operation-transmission mode. The operational information indicates an operational state of the transmission side electric working machine.

Such a communicator configured as above easily allows an unspecified electric working machine, which is configured to receive the operational information, to operate in conjunction with the transmission side electric working machine coupled to the communicator in accordance with the operational information. This helps to improve usefulness of the transmission side electric working machine.

The operational information may indicate a driving state of a tool of the transmission side electric working machine.

The communicator may also include a manipulator configured to be manipulated by a user of the communicator. The communication controller may also be configured to change the operating mode in response to a manipulation performed on the manipulator. This configuration enables the user to easily change the operating mode.

The communication controller may be further configured to cyclically transmit different information corresponding to the operating mode of the communication controller via the communication circuit. Such a communicator can transmit various information in accordance with the operating mode if specific information is appropriately allocated for each operation mode. In addition to the operation-transmission mode, the communication controller may also include, for example, an operating mode that does not involve a transmission of the operational information. In this case, the user can easily select whether to operate the unspecified electric working machine in conjunction with the transmission side electric working machine.

The communicator may also include a display that is configured to show information. The communication controller may also be configured to show mode information on the display. The mode information may include information to identify whether the operating mode is set to the operation-transmission mode.

The communicator configured as above enables the user to easily recognize whether the operating mode is set to the operation-transmission mode, in other words, whether the operating mode is set to a mode in which the operational information is transmitted.

The communication controller may be further configured to cyclically transmit the operational information at a first transmission cycle in response to the operating mode being set to the operation-transmission mode. The communication controller may be further configured to cyclically transmit a given information at a second transmission cycle, different from the first transmission cycle, in response to the operating mode being set to a given transmission mode, different from the operation-transmission mode. This configuration enables the communicator to set an appropriate transmission cycle in accordance with the operating mode, which can reduce electric power consumed for the transmission of information.

The first transmission cycle may be shorter than the second transmission cycle. In the operation-transmission mode, changes in the operational information can be promptly notified by a transmission at the first transmission cycle that is shorter than the second transmission cycle.

The communication controller may also be configured to cyclically transmit registration information via the communication circuit in response to the operating mode being set to a registration-transmission mode. The registration information may include a command directed to a first additional communicator to conduct a registration of first communicator information that identifies the communicator.

This configuration enables the communicator to register the first communicator information in the first additional communicator in response to the operating mode being set to the registration-transmission mode. For example, by transmitting the first communicator information in addition to the operational information, the transmitted operational information can be effective only to the first additional communicator.

The communication controller may also be configured to cyclically transmit deletion information via the communication circuit in response to the operating mode being set to a deletion-transmission mode. The deletion information may include a command directed to the first additional communicator to delete the registration of the first communicator information.

This configuration enables the communicator to cause the first additional communicator to delete the registration of the first communicator information in response to the operating mode being set to the deletion-transmission mode.

The connector may also be configured to be electrically coupled to a receiving side electric working machine. The communication controller may also be configured such that the operating mode is settable to an operation-receiving mode in response to the connector being coupled to the receiving side electric working machine. The communication controller may also be configured to cyclically monitor, at a first monitoring cycle, whether the operational information is received via the communication circuit in response to the operating mode being set to the operation-receiving mode. The communication controller in the operation-receiving mode may be further configured to output the operational information received.

This configuration enables the communicator to output to the receiving side electric working machine the operational information received in response to the operating mode being set to the operation-receiving mode. As a result, the receiving side electric working machine can operate in conjunction with the transmission side electric working machine.

The operational information may also indicate a driving state of a tool of the transmission side electric working machine.

The communication controller may also be configured to cyclically monitor, at a second monitoring cycle, information received via the communication circuit in response to the operating mode being set to a wait-receiving mode. The communication controller in the wait-receiving mode may further be configured to change the operating mode to the operation-receiving mode in response to a reception of the operational information via the communication circuit.

This configuration enables the communicator to operate, for example, in the wait-receiving mode under normal conditions and operate in the operation-receiving mode in response to a reception of the operational information. In other words, the communicator can operate in an appropriate mode depending on whether the operational information is received.

The first monitoring cycle may be shorter than the second monitoring cycle. This configuration enables the communicator to immediately recognize changes in the operational information received.

The operational information may be transmitted from a second additional communicator. The second additional communicator may be configured to transmit second communicator information that identifies the second additional communicator. The communication controller may also be configured to conduct a registration of the second communicator information received via the communication circuit in response to the operating mode being set to a registration-receiving mode. In addition, the communication controller may also be configured to change the operating mode from the wait-receiving mode to the operation-receiving mode in response to a reception of the operational information and the second communicator information, registered in the communication controller, via the communication circuit.

This configuration enables the communicator to easily register the second communicator information. In response to a reception of the operational information corresponding to the registered second communicator information, the communicator can effectively process the received operational information.

The communication controller may also be configured to delete the registration of the second communicator information based on given deletion information received via the communication circuit in response to the operating mode being set to a deletion-receiving mode. This configuration enables the communicator to easily delete the registered second communicator information. In other words, the communicator can register and delete the second communicator information as necessary.

The communicator may also include a display that is configured to show information. The communication controller may further be configured to show driving information on the display based on the operational information received via the communication circuit. The driving information may include information to identify whether the tool is driven. This configuration enables the user to easily identify a driving state of the tool of the transmission side electric working machine.

Another aspect of the present disclosure is a transmission side electric working machine that includes the aforementioned communicator and a transmission side driving device. The transmission side driving device is configured to drive a tool of the transmission side electric working machine.

Such a transmission side driving device configured as mentioned above can easily cause an unspecified other electric working machine, which is configured to receive operational information, to operate in conjunction with the transmission side electric working machine by transmitting the operational information. The usefulness of the transmission side electric working machine can therefore be improved.

Yet another aspect of the present disclosure is a receiving side electric working machine that includes any one of the aforementioned communicators, and a receiving side driving device. The receiving side driving device is configured to drive a tool of the receiving side electric working machine.

This configuration enables the receiving side electric working machine to drive the tool of the receiving side electric working machine in accordance with the driving state of the tool of the transmission side electric working machine in response to the operating mode of the communication controller of the communicator coupled to the receiving side electric working machine being set to the operation-receiving mode. The usefulness of the receiving side electric working machine can therefore be improved.

Still another aspect of the present disclosure is a communication method. The method may include setting an operating mode of a communicator to an operation-transmission mode in response to the communicator being coupled to an electric working machine. The method may include cyclically transmitting operational information from the communicator without specifying a recipient in response to the operating mode being set to the operation-transmission mode. The operational information indicates an operational state of the electric working machine.

BRIEF DESCRIPTION OF THE DRAWINGS

An example embodiment of the present disclosure will be described hereinafter with reference to the accompanying drawings, in which:

FIG. 4 is an explanatory diagram showing a configuration of a display and display patterns;

FIG. 7A is a flowchart showing a part of a communication control process; and

FIG. 7B is a flowchart showing the rest of the communication control process.

DETAILED DESCRIPTION OF THE PREFERRED EMBODIMENTS

1. Embodiment (1-1) Outline of Communication System

Figure 1:
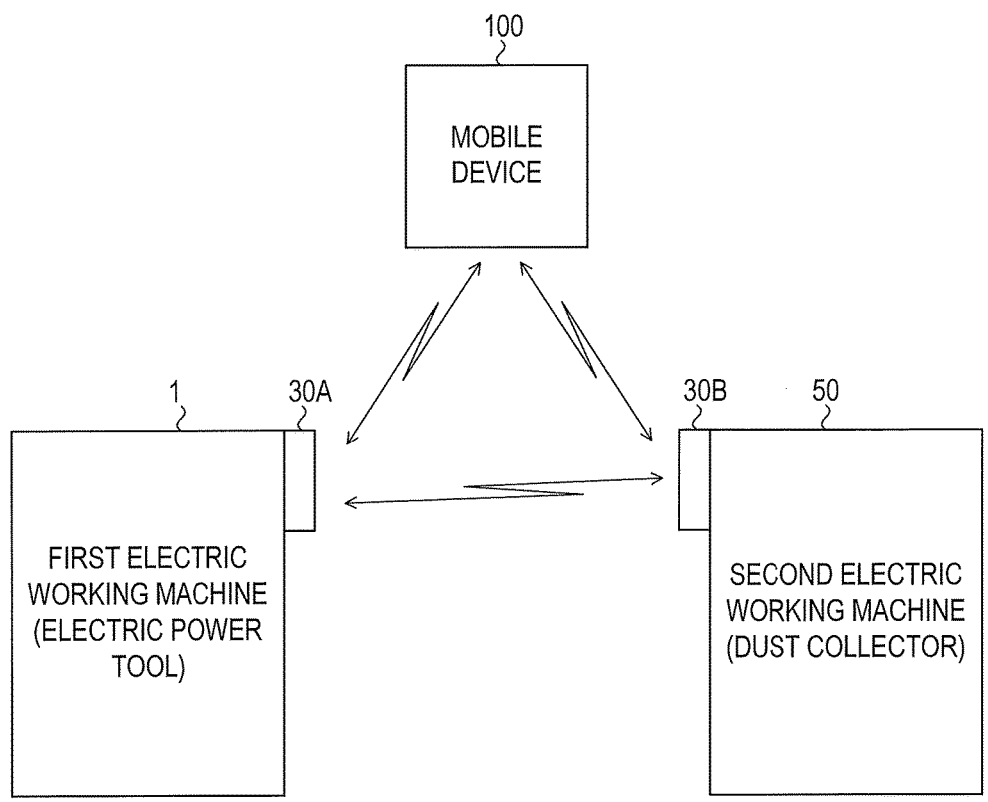
FIG. 1 is an explanatory diagram showing an outline of a communication system.

A communication system shown in FIG. 1 includes a first electric working machine 1, a second electric working machine 50, and a mobile device 100. In the present embodiment, the first electric working machine 1 may be an electric power tool. In the explanation hereinafter, the first electric working machine 1 will be also called an electric power tool 1. The second electric working machine 50 may be a dust collector in the present embodiment. In the explanation hereinafter, the second electric working machine 50 will be also called a dust collector 50.

Figure 2:
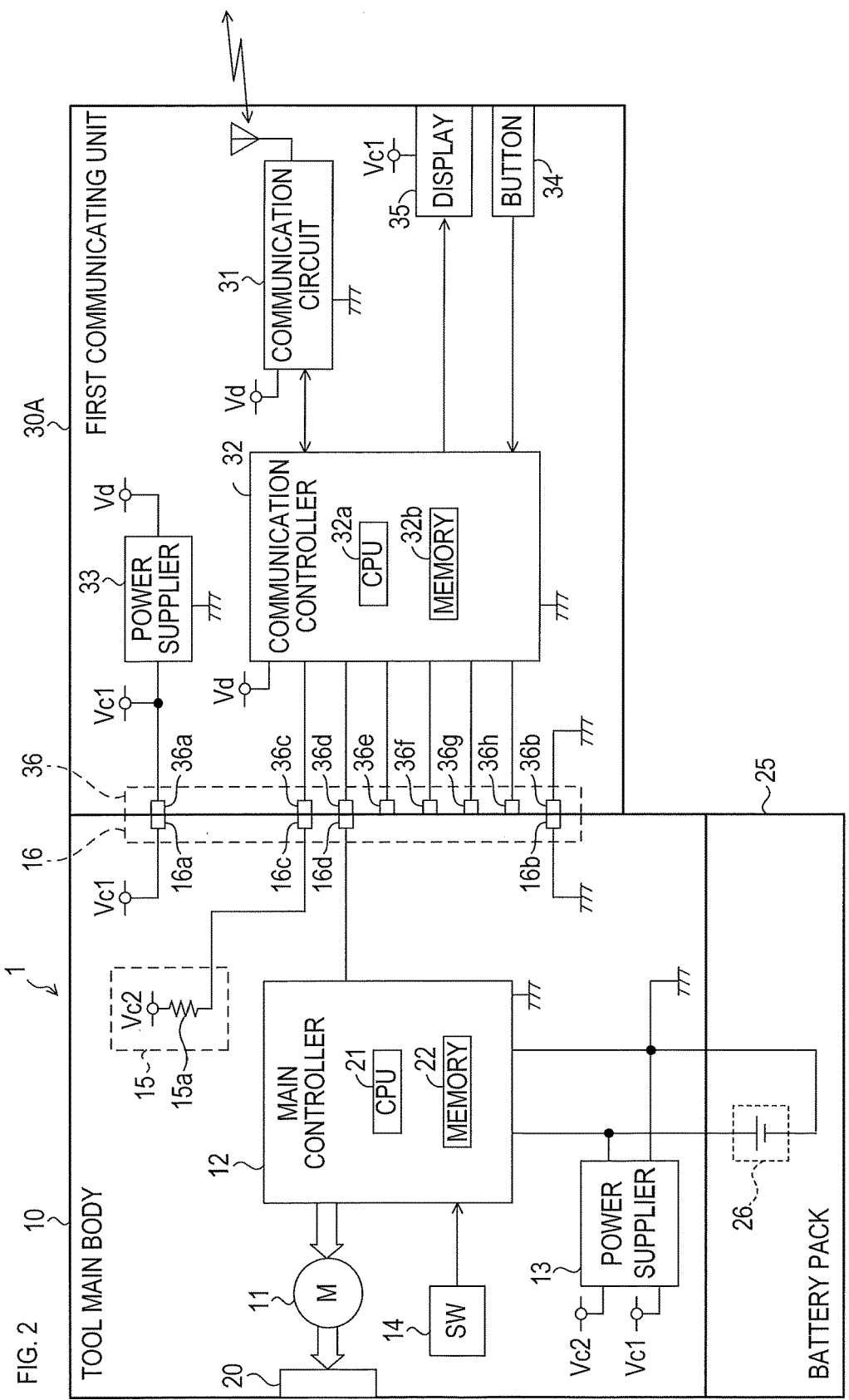
FIG. 2 is an explanatory diagram showing an electrical configuration of an electric power tool and a first communication device.

The electric power tool 1 is, for example, a circular saw including a circular saw blade 20 (not shown in FIG. 1; see FIG. 2). It is merely an example that the first electric working machine 1 is a circular saw; the first electric working machine 1 may be other electric power tool and may therefore be other electric working machine.

Figure 3:
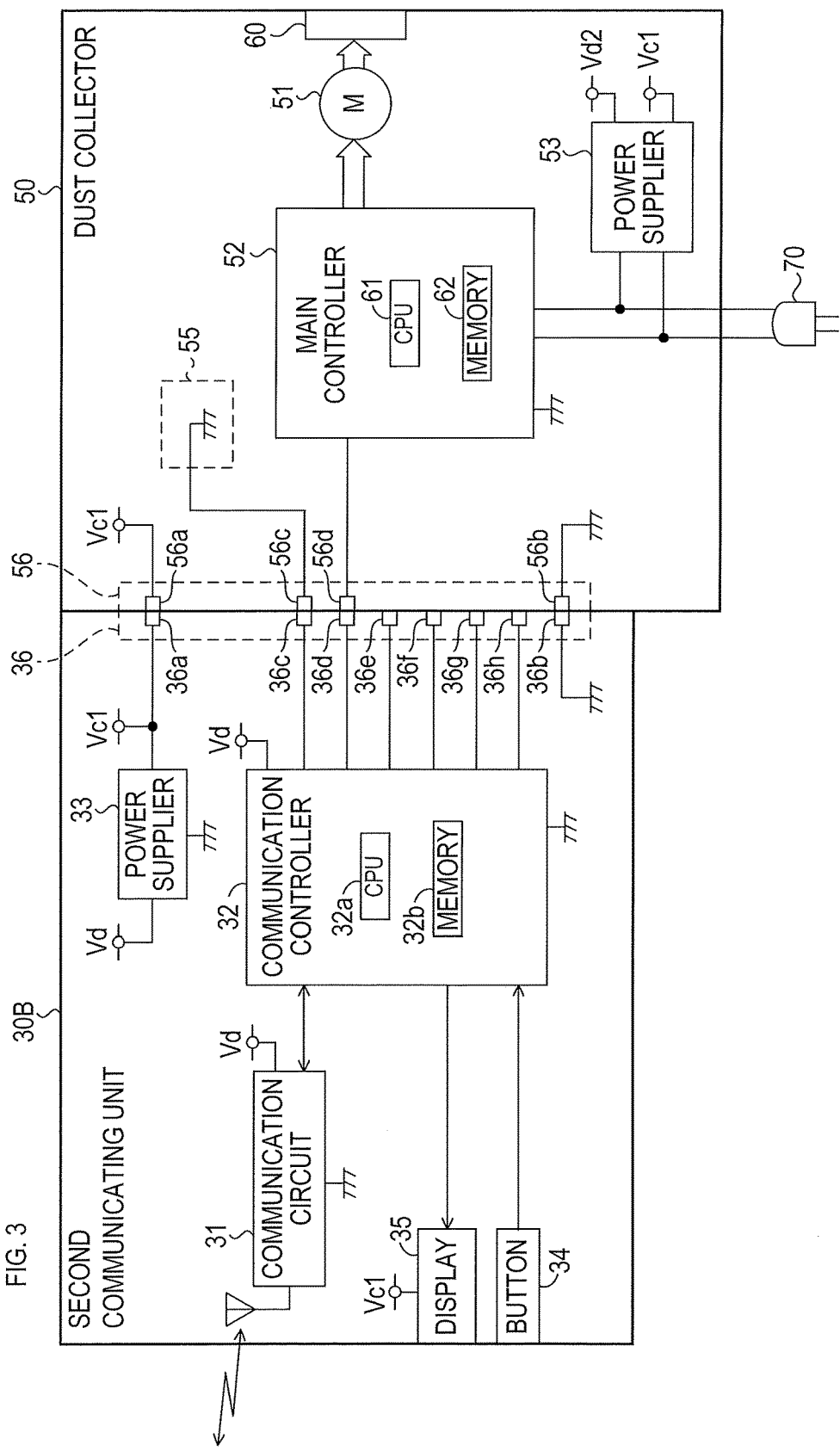
FIG. 3 is an explanatory diagram showing an electrical configuration of a dust collector and a second communication device.

The dust collector 50 includes, for example, a fan 60 (not shown in FIG. 1; see FIG. 3). The dust collector 50 is configured to vacuum waste particles and dusts in its surrounding area by driving the fan 60. In the present embodiment, the dust collector 50 can vacuum powdery waste and cutting scraps that are produced during the operation of the electric power tool 1.

The electric power tool 1 is configured such that a first communicating unit 30A is attachable to and detachable from the electric power tool 1. The dust collector 50 is configured such that a second communicating unit 30B is attachable to and detachable from the dust collector 50. FIG. 1 shows the first communicating unit 30A and the second communicating unit 30B attached to the electric power tool 1 and the dust collector 50 respectively. The first communicating unit 30A can wirelessly transmit and receive data. The second communicating unit 30B can also wirelessly transmit and receive data.

The first communicating unit 30A and the second communicating unit 30B wirelessly communicate with each other to cause the dust collector 50 to operate in conjunction with the electric power tool 1. To be more specific, the first communicating unit 30A transmits information that the electric power tool 1 is in operation during the operation of the electric power tool 1; the second communicating unit 30B receives this information and transmits the information to the dust collector 50 and causes the dust collector 50 to operate in conjunction with the electric power tool 1.

The first communicating unit 30A and the second communicating unit 30B are both configured to enable wireless communication by a predefined telecommunication system. The predefined telecommunication system in the present embodiment is in conformity with, for example, Bluetooth Low Energy (hereinafter also called "BLE") telecommunications standard. "Bluetooth" is a registered trademark.

The mobile device 100 is a data processing device with a wireless communication function, such as a smartphone, a tablet, and a laptop computer. The mobile device 100 is also enabled to wirelessly communicate with the first communicating unit 30A and the second communicating unit 30B through the aforementioned telecommunication system.

(1-2) Electrical Configuration of Electric Power Tool and First Communicating Unit An electrical configuration of the electric power tool 1 and the first communicating unit 30A will be explained next with reference to FIG. 2. The electric power tool 1 includes a tool main body 10, and a battery pack 25. The battery pack 25 is attachable to and detachable from the tool main body 10. FIG. 2 shows the tool main body 10 with the battery pack 25 and the first communicating unit 30A attached to the tool main body 10.

The battery pack 25 includes a battery 26 that is repeatedly rechargeable. The battery 26 in the present embodiment is, for example, a lithium ion rechargeable battery. Nevertheless, the battery 26 may be any rechargeable battery other than the lithium ion rechargeable battery. The battery pack 25 is configured to be attached to a not-shown charger to charge the battery 26.

The battery 26 may be included inside the tool main body 10. The battery 26 is merely an example power source of the electric power tool 1. The electric power tool 1 may be enabled for operation by a power supply from any power source other than the battery 26. For example, the electric power tool 1 may be enabled for operation by receiving alternating-current (AC) power via a power-supply cord plugged into an outlet of an AC power source, such as a commercial power source.

The tool main body 10 includes a motor 11, a main controller 12, a power-supply 13, a trigger switch 14, a role-determiner 15, a connector 16, and the aforementioned saw blade 20. The trigger switch 14 is a trigger-type manipulation switch. The trigger switch 14 is turned on and off by user manipulation.

The connector 16 includes a power-source terminal 16a, a ground terminal 16b, a role-determination terminal 16c, and an operational-signal terminal 16d.

The power-source terminal 16a is coupled to an output terminal of a first power supply voltage Vc1 in the power-supply 13. The ground terminal 16b is coupled to a ground line. The role-determination terminal 16c is coupled to the role-determiner 15. The operational-signal terminal 16d is coupled to the main controller 12.

Electric power of the battery 26 (hereinafter also called "battery power") is delivered to the main controller 12 and the power-supply 13. Based on the delivered battery power, the power-supply 13 generates a power supply voltage that is lower than a voltage of the battery 26. In the present embodiment, the power-supply 13 generates the first power supply voltage Vc1 and a second power supply voltage Vc2. A value of the first power supply voltage Vc1 may be 5 volts, for example. A value of the second power supply voltage Vc2 may be 3.3 volts, for example.

The first power supply voltage Vc1 and the second power supply voltage Vc2 are used as power-supply power for operating each component in the tool main body 10. The first power supply voltage Vc1 can be supplied from the power-source terminal 16a to an outer subject.

The main controller 12 includes a microcomputer that includes a CPU 21, and a memory 22. The memory 22 may include a semiconductor memory such as a RAM, a ROM, and a flash memory. The memory 22 stores various programs and data that the CPU 21 reads out and executes to achieve various functions of the electric power tool 1.

These various functions may be achieved partially or entirely by a hardware that includes a combination of circuits, such as a logic circuit and an analog circuit, and does not have to be achieved only by a software process as mentioned above.

In response to turning on of the trigger switch 14, the main controller 12 supplies the motor 11 with the battery power to drive the motor 11 in accordance with how the trigger switch 14 is manipulated. Driving of the motor 11 causes the saw blade 20 to rotate and enables the saw blade 20 to work. In response to turning off of the trigger switch 14, the main controller 12 stops delivering the battery power to the motor 11 to stop the motor 11, which leads the saw blade 20 to stop rotating.

The main controller 12 is basically configured to drive or stop the motor in accordance with how the trigger switch 14 is manipulated. Nevertheless, the main controller 12 may be configured to stop the motor 11 when the trigger switch 14 is turned on. For example, the battery pack 25 may be configured to transmit a signal to stop discharging to the tool main body 10 in an occasion where a given condition to stop discharging is satisfied during a discharge from the battery 26. The main controller 12 may be configured to stop the motor 11 in response to receiving the signal to stop discharging from the battery pack 25 regardless of the trigger switch 14 being turned on.

The main controller 12 transmits an operation-state signal to the operational-signal terminal 16d during driving the motor 11. The main controller 12 may also transmits the driving-state signal when the drive of the motor 11 is resumed from a stop state. The main controller 12 may also transmits the driving-state signal continuously or intermittently during the motor 11 being driven.

The main controller 12 transmits a stop-state signal to the operational-signal terminal 16d when the drive of the motor 11 is stopped. In a case where the main controller 12 is configured to transmit the driving-state signal continuously or intermittently during the motor 11 being driven, an end to the transmission of the driving-state signal may correspond to a transmission of the stop-state signal. The main controller 12 may also be configured to transmit the stop-state signal continuously or intermittently during the motor 11 being stopped. The motor 11 may be any type of motor. The motor 11 may be a brushed direct current (DC) motor, a brushless DC motor, or another type of motor.

The role-determiner 15 transmits a role-determining information to the first communicating unit 30A. The role-determining information is for determining how the first communicating unit 30A should operate. In the present embodiment, the role-determiner 15 transmits the second power supply voltage Vc2, as the role-determining information, via a resistor 15a. As mentioned later, the first communicating unit 30A operates as a transmission-oriented unit based on the role-determining information inputted from the tool main body 10 corresponding to the second power supply voltage Vc2.

The first communicating unit 30A includes a communication circuit 31, a communication controller 32, a power supplier 33, a button 34, a display 35, and a connector 36.

The button 34 receives a user manipulation. Specifically, the button 34 receives a pressing manipulation by a user to change (switch) a mode (operating mode) of the first communicating unit 30A.

The connector 36 is coupled to the connector 16 of the tool main body 10. The connector 36 includes a power-source terminal 36a, a ground terminal 36b, a role-determination terminal 36c, an operational-signal terminal 36d, three serial-communication terminals 36e, 36f, and 36g, and an auxiliary terminal 36h.

The power-source terminal 36a is coupled to the power supplier 33. The ground terminal 36b is coupled to the ground line. The remaining six terminals 36c, 36d, 36e, 36f, 36g, and 36h are coupled to the communication controller 32.

The connector 36 is coupled to the connector 16 as follows: the power-source terminal 36a is coupled to the power-source terminal 16a; the ground terminal 36b is coupled to the ground terminal 16b; the role-determination terminal 36c is coupled to the role-determination terminal 16c; and the operational-signal terminal 36d is coupled to the operational-signal terminal 16d.

The first power supply voltage Vc1 generated in the tool main body 10 is delivered to the first communicating unit 30A via the power-source terminal 36a. In addition, the first power supply voltage Vc1 delivered to the first communicating unit 30A is then delivered at least to the power supplier 33 and the display 35.

The power supplier 33 generates a control voltage Vd based on the delivered first power supply voltage Vc1. A value of the control voltage Vd may be 3.3 volts for example. The control voltage Vd is used as power-supply power for operating the components of the first communicating unit 30A, including at least the communication circuit 31 and the communication controller 32.

The communication circuit 31 receives and transmits wireless-communication radio wave that is in conformity with the aforementioned telecommunications standard (BLE, for example). In accordance with a transmission command from the communication controller 32, the communication circuit 31 converts various data for transmission, delivered from the communication controller 32, into wireless signals and wirelessly transmits the wireless signals to an outer subject. The communication circuit 31 also converts wireless signals received from an outer subject into data and transmits the data to the communication controller 32.

The communication controller 32 includes a microcomputer that includes a CPU 32a, and a memory 32b. The memory 32b may include a semiconductor memory such as a RAM, a ROM, and a flash memory. The memory 32b stores various programs and data for achieving various functions of the first communicating unit 30A. These various functions of the first communicating unit 30A are achieved by the CPU 32a executing the various programs stored in the memory 32b. Nevertheless, these various functions achieved by the communication controller 32 may also be achieved partially or entirely by a hardware that includes a combination of circuits, such as a logic circuit and an analog circuit, and does not have to be achieved only by a software process.

The communication controller 32 is configured to function as the transmission-oriented unit or as the search-oriented unit depending on a device to which the first communicating unit 30A is attached.

The transmission-oriented unit transmits a wait-notice, a conjunction-notice, a registration-notice, and a deletion-notice unilaterally and cyclically without specifying a recipient; that is, in other words, the transmission-oriented unit performs a regular wireless broadcasting of these notices. Cyclic transmissions of these notices are those called "advertise" or "advertising" in BLE, for example.

The search-oriented unit (i) searches for the above notices transmitted from the transmission-oriented unit, (ii) receives any one of the notices, and (iii) executes a process in accordance with the received notice.

The communication controller 32 operates as the transmission-oriented unit if the role-determining information corresponds to the second power supply voltage Vc2. The communication controller 32 operates as the search-oriented unit if the delivered role-determining information corresponds to the voltage of the ground line.

In the present embodiment, the tool main body 10 is configured to transmit the second power supply voltage Vc2 as the role-determining information. Thus, the communication controller 32 operates as the transmission-oriented unit when the first communicating unit 30A is attached to the tool main body 10.

The communication controller 32 operating as the transmission-oriented unit is set to one of a wait-transmission mode, a conjunction-transmission mode, a registration-transmission mode, and a deletion-transmission mode. The communication controller 32 operates in accordance with the set mode.

The communication controller 32 in the wait-transmission mode performs a wireless cyclic transmission (regular broadcasting) of the wait-notice at a first transmission cycle Ttr1 via the communication circuit 31. The wait-notice includes a first identification information that indicate the first communicating unit 30A, and information indicating that the notice in the transmission is the wait-notice. The first transmission cycle Ttr1 may be 100 ms ("ms" is millisecond) for example.

The communication controller 32 in the conjunction-transmission mode performs a wireless cyclic transmission (regular broadcasting) of the conjunction-notice at a second transmission cycle Ttr2 via the communication circuit 31. The conjunction-notice includes the first identification information, information indicating that the notice in the transmission is the conjunction-notice, and machine-operational information that indicate the operational state of the electric power tool 1. In the present embodiment, the machine-operational information may indicate a driving state of the saw blade 20, for example. The second transmission cycle Ttr2 may be 30 ms for example.

The communication controller 32 in the registration-transmission mode performs a wireless cyclic transmission (regular broadcasting) of the registration-notice at a third transmission cycle Ttr3 via the communication circuit 31. The registration-notice includes the first identification information, and information indicating that the notice in the transmission is the registration-notice (this information corresponds to one example of registration information in the present disclosure). The third transmission cycle Ttr3 may be 100 ms for example.

The communication controller 32 in the deletion-transmission mode performs a wireless cyclic transmission (regular broadcasting) of the deletion-notice at a fourth transmission cycle Ttr4 via the communication circuit 31. The deletion-notice includes the first identification information, and information indicating that the notice in the transmission is the deletion-notice (this information corresponds to one example of deletion information in the present disclosure). The fourth transmission cycle Ttr4 may be 100 ms for example.

In the present embodiment, the second transmission cycle is shorter than any of the first transmission cycle Ttr1, the third transmission cycle Ttr3, and the fourth transmission cycle Ttr4. In the present embodiment, all of the wait-notice, the conjunction-notice, the registration-notice, and the deletion-notice are transmitted without specifying a recipient as mentioned above. In another embodiment, the recipient of at least one of these notices may be specified.

For example, assume that another communicating unit configured to operate as a transmission-oriented unit is present in addition to the first communicating unit 30A. In this case, if the regular broadcasting is performed by both of the first communicating unit 30A and the another communicating unit at the same transmission cycle, then transmissions of the notice from these communicating units may cyclically and continuously overlap with each other, which may lead to cyclic and continuous collision of the transmitted notices. As a consequence, the notices may fail to be received properly by the second communicating unit 30B.

To reduce such collision of the notices, at least one of the transmission cycles Ttr1, Ttr2, Ttr3, or Ttr4 may be set to a different value for each of the first communicating unit 30A, the second communicating unit 30B, and the additional communicating unit.

The first communicating unit 30A receives the aforementioned driving-state signal or the aforementioned stop-state signal from the tool main body 10 via the operational-signal terminal 36d.

The driving-state signal indicates that the motor 11 is being driven or the saw blade 20 is rotating. The stop-state signal indicates that the motor 11 is stopped or the saw blade 20 is stopped.

The communication controller 32 in the conjunction-transmission mode generates the machine-operational information based on the driving-state signal or the stop-state signal delivered from the tool main body 10. More specifically, the communication controller 32 generates driving-state information as the machine-operational information when the communication controller 32 receives the driving-state signal; the communication controller 32 generates stop-state information as the machine-operational information when the communication controller 32 receives the stop-state signal.

In other words, the conjunction-notice that includes either the driving-state information or the stop-state information is cyclically transmitted from the first communicating unit 30A, in which the communication controller 32 is set to the conjunction-transmission mode.

As mentioned later, the dust collector 50 is driven in conjunction with the electric power tool 1 when the conjunction-notice that includes the driving-state information is received by the second communicating unit 30B. More specifically, the fan 60 of the dust collector 50 is activated in response to a drive of a later-described motor 51 (see FIG. 3) in the dust collector 50. This conjunctive operation of the dust collector 50 is stopped when the conjunction-notice that includes the stop-state information is received by the second communicating unit 30B after the conjunctive operation of the dust collector 50 is started. In other words, the fan 60 is stopped in response to stop of the drive of the motor 51.

The mode of the communication controller 32 changes by pressing the button 34 of the first communicating unit 30A. In other words, the user can change the notice to be cyclically transmitted by the first communicating unit 30A, by pressing the button 34 of the first communicating unit 30A.

The display 35 is configured to use the first power supply voltage Vc1 as the power-supply power for operation and to notify the operation state of the first communicating unit 30A to an outer subject. In the present embodiment, the display 35 includes a first LED 35*a*, a second LED 35*b*, and a third LED 35*c* as shown in FIG. 4. For example, the first LED 35*a* may emit a green light, the second LED 35*b* may emit a blue light, and the third LED 35*c* may emit a red light.

The communication controller 32 controls each of LED 35*a*, 35*b*, and 35*c* in accordance with the operational state of the first communicating unit 30A. The communication controller 32 may control the LED 35*a*, LED 35*b*, and LED 35*c* in accordance with the operational state of the first communicating unit 30A to at least one of seven example light-emitting patterns shown in FIG. 4, for example.

(1-3) Electrical Configuration of Dust Collector and Second Communicating Unit

An electrical configuration of the dust collector 50 will be explained next with reference to FIG. 3. FIG. 3 shows the dust collector 50, with the second communicating unit 30B attached thereto. In this embodiment, a configuration of the second communicating unit 30B is the same as the configuration of the first communicating unit 30A as shown in FIG. 2. The second communicating unit 30B is different from the first communicating unit 30A in terms of information to be input and output via the connector 36, and the mode to be set to the communication controller 32 since the second communicating unit 30B is attached to the dust collector 50.

The dust collector 50 includes the motor 51, a main controller 52, a power supplier 53, a role-determiner 55, a connector 56, the fan 60, and a plug 70.

The connector 56 is coupled to the connector 36 of the second communicating unit 30B. The connector 56 includes a power-source terminal 56*a*, a ground terminal 56*b*, a role-determination terminal 56*c*, and an operational-signal terminal 56*d*.

The power-source terminal 56*a* is coupled to an output terminal of the first power supply voltage Vc1 in the power supplier 53. The ground terminal 56*b* is coupled to the ground line. The role-determination terminal 56*c* is coupled to the role-determiner 55. The operational-signal terminal 56*d* is coupled to the main controller 52.

The connector 36 of the second communicating unit 30B is coupled to the connector 56 of the dust collector 50 as follows: the power-source terminal 36*a* is coupled to the power-source terminal 56*a*; the ground terminal 36*b* is coupled to the ground terminal 56*b*; the role-determination terminal 36*c* is coupled to the role-determination terminal 56*c*, and the operational-signal terminal 36*d* is coupled to the operational-signal terminal 56*d*. The first power supply voltage Vc1 generated in the dust collector 50 is delivered to the second communicating unit 30B via the power-source terminal 56*a*.

The motor 51 drives the fan 60. The power supplier 53 receives AC power supplied from an outside power source (such as a commercial power source) via the plug 70 and, based on the AC power, generates power-supply power to operate each component in the dust collector 50.

More specifically, the power supplier 53 generates the first power supply voltage Vc1 and the second power supply voltage Vd2 based on the AC power delivered via the plug 70. The first power supply voltages Vc1 and the second power supply voltage Vd2 are used as power-supply power for operating each component in the dust collector 50. The first power supply voltage Vc1 can be supplied from the power-source terminal 56*a* to an outer subject.

The dust collector 50 may be configured to be operable by direct-current (DC) power from a battery in a battery pack by having a configuration to allow the battery pack to be attached to and detached from the dust collector 50 like the electric power tool 1, or from a built-in battery by having a configuration to include the built-in battery.

The motor 51 may be any type of motor The motor 51 may be a brushed DC motor, a brushless DC motor, or another type of motor.

The main controller 52 includes a microcomputer that includes a CPU 61, and a memory 62. The memory 62 may include a semiconductor memory such as a RAM, a ROM, and a flash memory. The memory 62 stores various programs and data for the CPU 61 to read out and execute to achieve various functions of the dust collector 50.

These various functions may be achieved partially or entirely by a hardware that includes a combination of circuits, such as a logic circuit and an analog circuit, and does not have to be achieved only by a software process.

In response to turning on of a manipulation switch (not shown) of the dust collector 50, the main controller 52 rotates the fan 60 by driving the motor 51. Occasionally, as explained later, the main controller 52 receives a conjunction command from the second communicating unit 30B via the operational-signal terminal 56*d*. The main controller 52 rotates the fan 60 also by driving the motor 51 in an occasion of receiving the conjunction command.

The role-determiner 55 transmits the role-determining information to the second communicating unit 30B. In the present embodiment, the role-determiner 15 transmits, for example, the voltage of the ground line as the role-determining information.

The communication controller 32 of the second communicating unit 30B operates as the search-oriented unit since the role-determining information delivered from the dust collector 50 corresponds to the voltage of the ground line.

The communication controller 32 operating as the search-oriented unit is set to any one of a wait-search mode, a conjunction-search mode, a registration-search mode, and a deletion-search mode. The communication controller 32 operates in accordance with the set mode.

The communication controller 32 in the wait-search mode cyclically searches (or scans) the wait-notice. More specifically, the communication controller 32 cyclically determines whether the communication circuit 31 receives the wait-notice at a first interval Tin1. The first interval Tin1 may be 340 ms for example. The first interval Tin1 includes a first window Tw1. The first window Tw1 is a time period in which an actual determination is made on whether the wait-notice is received. The first window Tw1 may be 100 ms for example.

The communication controller 32 in the conjunction-search mode cyclically searches the conjunction-notice at a second interval Tin2. The second interval Tin2 may be 140 ms for example. The second interval Tin2 includes a second window Tw2. The second window Tw2 is a time period in which an actual determination is made on whether the conjunction-notice is received. The second window Tw2 may be 100 ms for example.

The communication controller 32 in the registration-search mode cyclically searches the registration-notice at a third interval Tin3. The third interval Tin3 may be 65 ms for example. The third interval Tin3 includes a third window Tw3. The third window Tw3 is a time period in which an actual determination is made on whether the registration-notice is received. The third window Tw3 may be 60 ms for example.

The communication controller 32 in the deletion-search mode cyclically searches the deletion-notice at a fourth interval Tin4. The fourth interval Tin4 may be 65 ms for example. The fourth interval Tin4 includes a fourth window Tw4. The fourth window Tw4 is a time period in which an actual determination is made on whether the deletion-notice is received. The fourth window Tw4 may be 60 ms for example.

In the present embodiment, the second interval Tin2 may be set shorter than the first interval Tin1. The third interval Tin3 may be set shorter than any one of the first interval Tin1 and the second interval Tin2. Similarly, the fourth interval Tin4 may be set shorter than any one of the first interval Tin1 and the second interval Tin2. The third window Tw3 may be set shorter than any one of the first window Tw1 and the second window Tw2. Similarly, the fourth window Tw4 may be set shorter than any one of the first window Tw1 and the second window Tw2.

In response to the button 34 pressed in the second communicating unit 30B, the communication controller 32 changes its mode (its operating mode). The user can change the notices to be searched by pressing the button 34 of the second communication unit 30B.

Every time the communication circuit 31 receives the conjunction-notice, the communication controller 32 in the conjunction-search mode determines the detail of the received conjunction-notice. If the received conjunction-notice includes the aforementioned driving-state information, and the first identification information included in the received conjunction-notice is registered in the second communicating unit 30B, then the communication controller 32 transmits the conjunction command via the operational-signal terminal 36d. The conjunction command is then delivered to the main controller 52 of the dust collector 50 and causes the dust collector 50 to operate in conjunction with the electric power tool 1.

After transmitting the conjunction command, the communication controller 32 transmits a stop command via the operational-signal terminal 36d when the conjunction-notice including the stop-state information is received. In response to the stop command, the main controller 52 of the dust collector 50 stops the motor 51 to thereby stop the fan 60.

The main controller 52 may stop the motor 51 at any timing in response to the delivery of the stop command to the main controller 52. For example, the main controller 52 may immediately stop the motor 51 in response to the delivery of the stop command. Alternatively, the main controller 52 may keep driving the motor 51 for a predefined time period in response to the delivery of the stop command, and may stop the motor 51 in response to the predefined time period elapsed.

(1-4) Example Operation of First Communicating Unit

An example operation of the first communicating unit 30A attached to the electric power tool 1, in other words, an example operation of the first communicating unit 30A as the transmission-oriented unit, will be described with reference to FIG. 5. The description will be given by way of example assuming that the first communication unit 30A can perform wireless communications with the second communication unit 30B.

Figure 5:
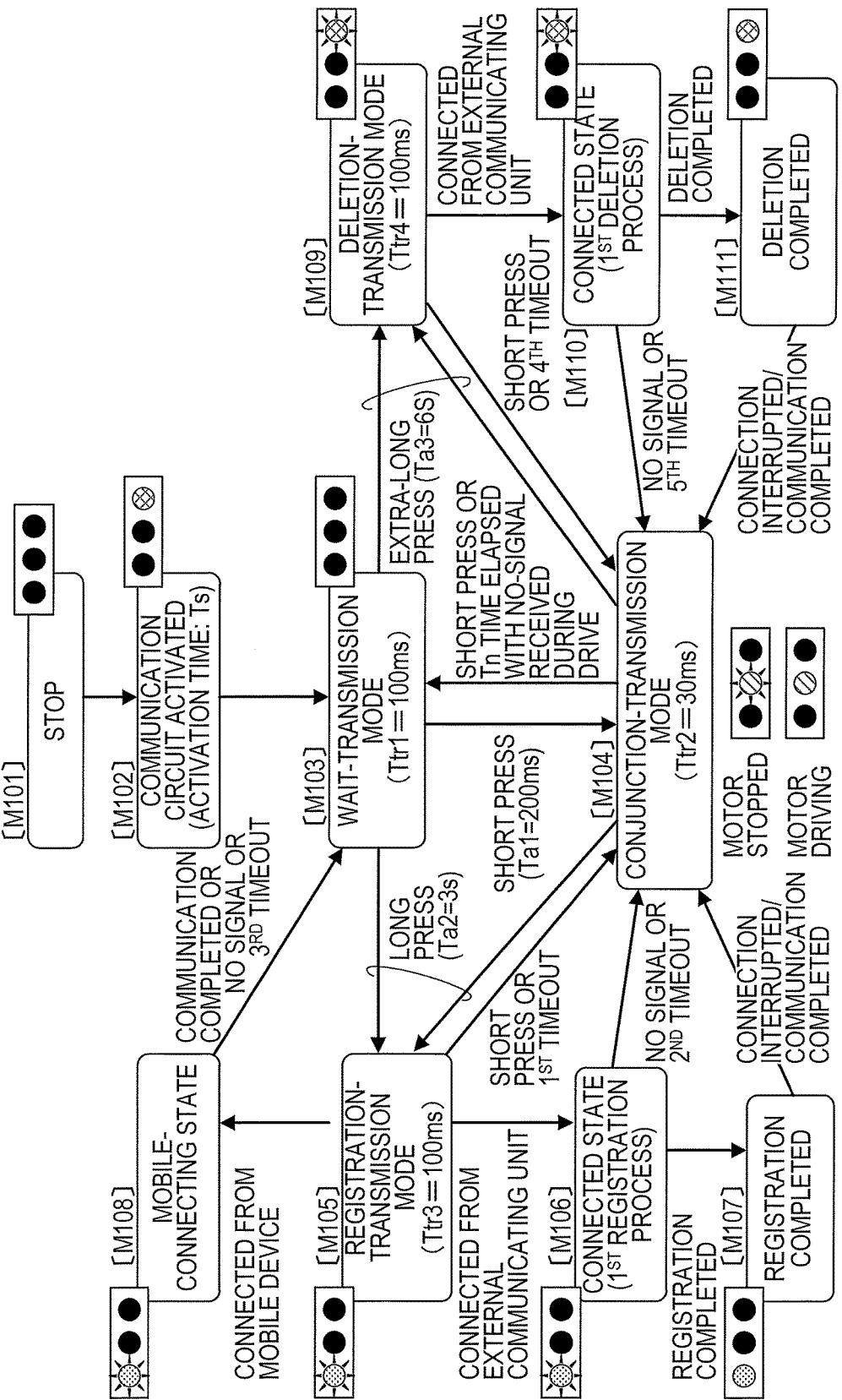
FIG. 5 is an explanatory diagram showing an example operation of a transmission-oriented unit.

As shown in FIG. 5, in a state where the first communicating unit 30A stops its operation due to, for example, no supply of the power-supply power to the first communicating unit 30A, all of the LEDs 35a, 35b, and 35c of the display 35 are turned off (M101). When the first communicating unit 30A is supplied with the first power supply voltage Vc1 from the electric power tool 1, the first communicating unit 30A is activated (thus the communication controller 32 is activated) (M102).

The activated communication controller 32 activates the communication circuit 31 (M102). Specifically, the communication controller 32 performs a given activation process to activate the communication circuit 31 for a duration of an activation time Ts (about 3 seconds, for example). During the activation process, the communication controller 32 turns the third LED 35c on in the display 35.

Also in M102, the communication controller 32 determines which role of the transmission-oriented unit or the search-oriented unit the communication controller 32 takes on based on the role-determining information delivered from the role-determination terminal 36c. Due to the role-determining information corresponding to the second power voltage Vc2, the communication controller 32 determines that the communication controller 32 takes on the role of the transmission-oriented unit. Thus, after the activation process, the communication controller 32 sets itself to the wait-transmission mode (M103).

In the wait-transmission mode, the communication controller 32 unilaterally transmits the wait-notice (regular broadcasting) at the first transmission cycle Ttr1 via the communication circuit 31. More specifically, the communication controller 32 commands the communication circuit 31 to regularly broadcast the wait-notice. The communication controller 32 itself shifts into a sleep state, in which power consumption is reduced compared with normal states. The communication controller 32 turns on all of the LEDs 35a, 36b, and 36c of the display 35 during the wait-transmission mode.

During the wait-transmission mode, the user may change the mode of the communication controller 32 by pressing the button 34 (e.g. performing a short press, a long press, or an extra-long press).

The short press is a manipulation for which the user keeps pressing the button 34 for a time period less than a first press-time Ta1 (200 milliseconds, for example). The long press is a manipulation for which the user keeps pressing the button 34 for a time period equal to or longer than the first press-time Ta1 but less than a second press-time Ta2 (3 seconds, for example). The extra-long press is a manipulation for which the user keeps pressing the button 34 for a time period equal to or longer than the second press-time Ta2 but less than a third press-time Ta3 (6 seconds, for example).

In response to the short press on the button 34 in the wait-transmission mode (M103), the communication controller 32 changes its mode to the conjunction-transmission mode (M104).

In the conjunction-transmission mode, the communication controller 32 unilaterally transmits (regular broadcasting) the conjunction-notice at the second transmission cycle Ttr2.

The communication controller 32 also turns on or flashes the second LED 35b during the conjunction-transmission mode. More specifically, the communication controller 32 flashes the second LED 35b when the stop-state signal is delivered from the tool main body 10, which is when the communication controller 32 is wirelessly transmitting the stop-state information as the machine-operational information. The communication controller 32 turns on the second LED 35b when the driving-state signal is delivered from the tool main body 10, which is when the communication controller 32 is wirelessly transmitting the driving-state information as the machine-operational information.

In the conjunction-transmission mode (M104), if the button 34 receives the short press, or if a time Tn (2 hours, for example) or longer has elapsed without a delivery of the driving-state signal from the tool main body 10, the communication controller 32 changes its mode to the wait-transmission mode (M103).

If the button 34 receives the long press in the wait-transmission mode (M103) or the conjunction-transmission mode (M104), then the communication controller 32 changes its mode to the registration-transmission mode (M105). In the registration-transmission mode, the communication controller 32 unilaterally transmits (regular broadcasting) the registration-notice at the third transmission cycle Ttr3 via the communication circuit 31. In the registration-transmission mode, the communication controller 32 flashes the first LED 35a.

If a first connection request is delivered from the second communicating unit 30B in response to the transmitted registration-notice in the registration-transmission mode (M105), then the communication controller 32 stops the regular transmission of the registration-notice and establishes a connection with the second communicating unit 30B (M106). Once the connection with the second communicating unit 30B is established, the second communicating unit 30B transmits a second identification information indicating the second communicating unit 30B, and the communication controller 32 executes a first registration process (M106).

The second communicating unit 30B in the registration-search mode transmits the first connection request in response to receipt of the registration-notice.

The first registration process is a process to store the second identification information received via the communication circuit 31 in the memory 32b to thereby register the second identification information (thus the second communicating unit 30B). The first registration process may include a process to transmit the first identification information via the communication circuit 31. In a case where the first registration process is performed in the first communicating unit 30A, the first identification information (thus the first communicating unit 30A) is registered in the second communicating unit 30B as described below. More specifically, in a case where the first identification information is "A0" and the second identification information is "B1", for example, the second identification information "B1" is registered in the first communicating unit 30A and the first identification information "A0" is registered in the second communicating unit 30B.

During the execution of the first registration process, the communication controller 32 flashes the first LED 35a (M106). Once the registration process is completed, the communication controller 32 keeps the first LED 35a on (M107). The communication controller 32 then ends the connection with the second communicating unit 30B, completes the data communication, and changes its mode to the conjunction-transmission mode (M104).

If the button 34 receives the short press or if a first timeout occurs in the registration-transmission mode (M105), then the communication controller 32 changes its mode to the conjunction-transmission mode (M104). The first timeout means that a first time period (20 seconds, for example) elapses without receiving the first connection request.

If the radio wave from the second communicating unit 30B fails to be received or if a second timeout occurs after the first connection request from the second communicating unit 30B is received in the registration-transmission mode (M106), then the communication controller 32 changes its mode to the conjunction-transmission mode (M104). The second timeout means that a second time period elapses without properly completing the first registration process albeit the radio wave from the second communicating unit 30B is received (in other words, the connection with the second communicating unit 30B is maintained).

If a first mobile connection request is received from the mobile device 100 in the registration-transmission mode (M105), then the communication controller 32 stops the regular transmission of the registration-notice, establishes a connection with the mobile device 100, and performs a data communication with the mobile device 100 (M108). If the data communication with the mobile device 100 is completed or if the radio wave from the mobile device 100 fails to be received or if a third timeout occurs, then the communication controller 32 changes its mode to the wait-transmission mode (M103). The third timeout means that a third time period elapses without properly completing the data communication with the mobile device 100 albeit the radio wave1 from the mobile device 100 is received (in other words, the connection with the mobile device 100 is maintained).

If the button 34 receives the extra-long press in the wait-transmission mode (M103) or in the conjunction-transmission mode (M104), then the communication controller 32 changes its mode to the deletion-transmission mode (M109). In the deletion-transmission mode, the communication controller 32 unilaterally transmits (regular broadcasting) the deletion-notice at the fourth transmission cycle Ttr4 via the communication circuit 31. In the deletion-transmission mode, the communication controller 32 flashes the third LED 35c.

If the second connection request is delivered from the second communicating unit 30B in response to the transmitted deletion-notice in the deletion-transmission mode (M109), the communication controller 32 stops the regular transmission of the deletion-notice and establishes a connection with the second communicating unit 30B (M110). Once the connection with the second communicating unit 30B is established, the communication controller 32 executes a first deletion process (M110).

The second communicating unit 30B in the deletion-search mode transmits the second connection request in response to receipt of the deletion-notice.

The first deletion process is a process to delete the second identification information stored in the memory 32b, for example, to thereby delete the registration of the second communicating unit 30B. In a case where the first deletion process is performed in the first communicating unit 30A, the first identification information is deleted (in other words, the registration of the first communicating unit 30A is deleted)

During the execution of the first deletion process, the communication controller 32 flashes the third LED 35c (M110). Once the first deletion process is completed, the communication controller 32 keeps the third LED 35c on (M111). The communication controller 32 then ends the connection with the second communicating unit 30B, completes the data communication, and changes its mode to the conjunction-transmission mode (M104).

If the button 34 receives the short press or if a fourth timeout occurs in the deletion-transmission mode (M109), then the communication controller 32 changes its mode to the conjunction-transmission mode (M104). If the radio wave from the second communicating unit 30B fails to be received or a fifth timeout occurs after the second connection request from the second communicating unit 30B is received in the deletion-transmission mode (M110), then the communication controller 32 changes its mode to the conjunction-transmission mode (M104). In a case where an additional communicating unit operating as the search-oriented unit exists in addition to the second communicating unit 30B, the first communicating unit 30A can perform a wireless communication with the additional communicating unit in a similar manner to the wireless communication with the second communicating unit 30B.

(1-5) Example Operation of Second Communicating Unit

Figure 6:
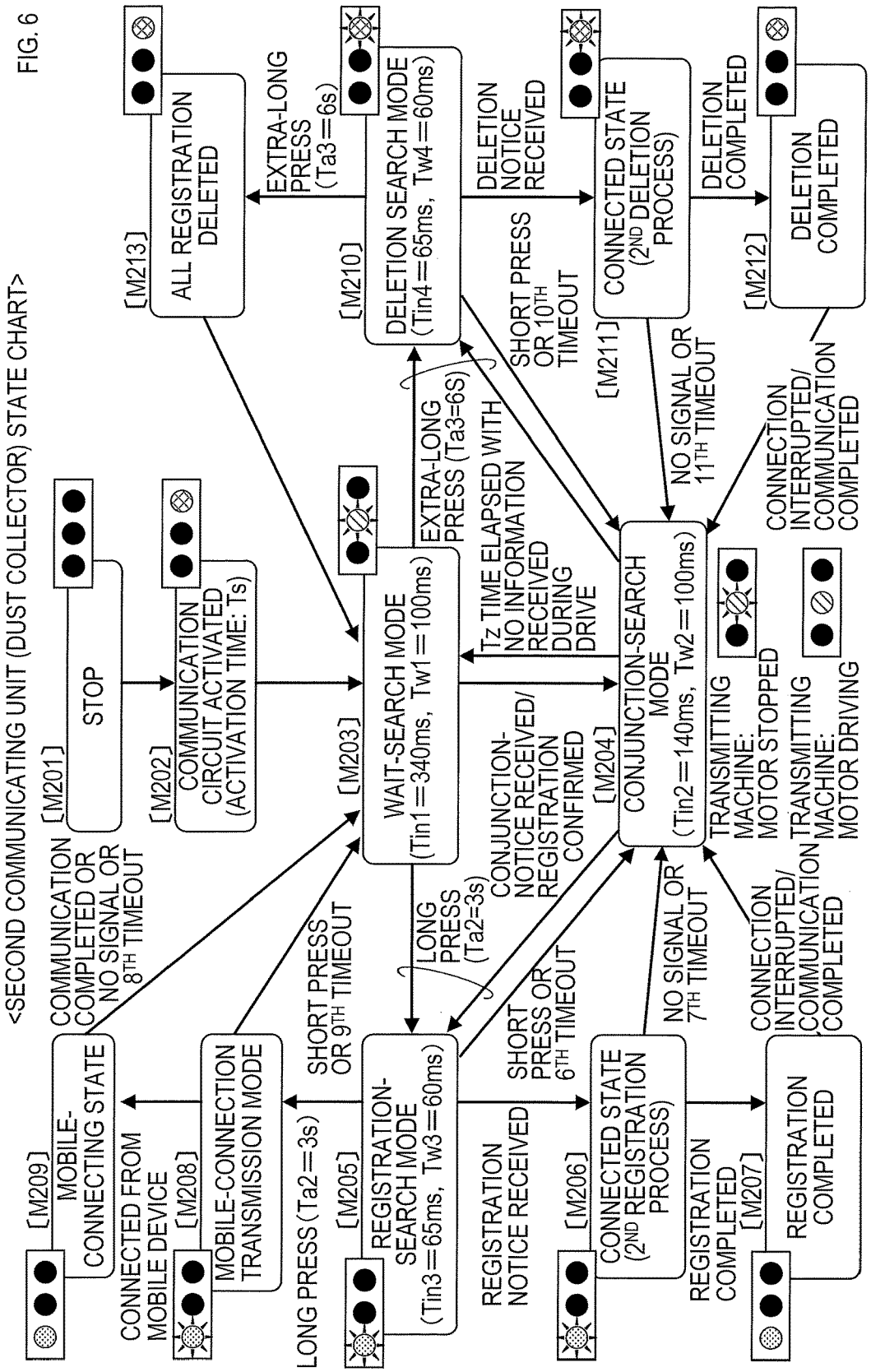
FIG. 6 is an explanatory diagram showing an example operation of a search-oriented unit.

An example operation of the second communicating unit 30B attached to the dust collector 50, in other words, an example operation of the second communicating unit 30B operating as the search-oriented unit, will be explained with reference to FIG. 6. The description will be given by way of example assuming that the second communication unit 30B can perform wireless communications with the first communication unit 30A.

The state where the second communicating unit 30B stops its operation due to no supply of the power-supply power to the second communicating unit 30B, for example (M201), and the state where the communication controller 32 performs the activation process to activate the communication circuit 31 (M202) are respectively the same as M101 and M102 in FIG. 5.

In M202, the communication controller 32 determines that the communication controller 32 takes on the role of the search-oriented unit since the role-determining information delivered from the dust collector 50 corresponds to the voltage of the ground line. Thus, after the activation process, the communication controller 32 sets its mode to the wait-search mode (M203).

In the wait-search mode, the communication controller 32 cyclically searches for the wait-notice via the communication circuit 13 at the first interval Tin1 and for the first window Tw1. The communication controller 32 flashes the second LED 35b during the wait-search mode.

In the wait-search mode, if the conjunction-notice is received and if the first identification information included in the conjunction-notice is registered in the second communicating unit 30B, then the communication controller 32 changes its mode to the conjunction-search mode (M204).

In the conjunction-search mode, the communication controller 32 cyclically searches for the conjunction-notice at the second interval Tin2 and for the second window Tw2. Every time the communication controller 32 receives the conjunction-notice including the first identification information registered in the second communicating unit 30B, the communication controller 32 determines whether the dust collector 50 should operate in conjunction with the electric power tool 1 based on the machine-operational information included in the conjunction-notice.

More specifically, the communication controller 32 transmits the stop command to the dust collector 50 via the operational-signal terminal 36d to prevent the conjunctive operation if the machine-operational information includes the stop-state information. The communication controller 32 transmits the conjunction command to the dust collector 50 via the operational-signal terminal 36d to cause the conjunctive operation if the machine-operational information includes the driving-state information.

The communication controller 32 flashes the second LED 35b when the conjunction-notice including the stop-state information is received (in other words, when the communication controller 32 prevents the conjunctive operation) during the conjunction-search mode. The communication controller 32 turns the second LED 35b on when the conjunction-notice including the driving-state information is received (in other word, when the communication controller 32 allows the dust collector 50 for the conjunctive operation).

In the conjunction-search mode, if a time Tz (2 hours, for example) or longer has elapsed without a delivery of the driving-state information, then the communication controller 32 changes its mode to the wait-search mode (M203).

If the button 34 receives the long press in the wait-search mode (M203) or the conjunction-search mode (M204), then the communication controller 32 changes its mode to the registration-search mode (M205). In the registration-search mode, the communication controller 32 cyclically searches for the registration-notice at the third interval Tin3 and for the third window Tw3. In the registration-search mode, the communication controller 32 also flashes the first LED 35a.

If the registration-notice is delivered from the first communicating unit 30A in the registration-search mode, the communication controller 32 transmits the aforementioned first connection request to the first communicating unit 30A to thereby establish a connection with the first communicating unit 30A (M206). Once the connection with the first communicating unit 30A is established, the communication controller 32 executes the second registration process. In other words, the communication controller 32 stores the first identification information included in the delivered registration-notice in the memory 32 to thereby register the first identification information (thus the first communicating unit 30A). The communication controller 32 also transmits the second identification information to the first communicating unit 30A (M206).

During the execution of the second registration process, the communication controller 32 flashes the first LED 35a (M206). Once the second registration process is completed, the communication controller 32 keeps the first LED 35a on (M207). The communication controller 32 then ends the connection with the first communicating unit 30A, completes the data communication, and changes its mode to the conjunction-search mode (M204).

If the button 34 receives the short press or if a sixth timeout occurs in the registration-search mode (M205), then the communication controller 32 changes its mode to the conjunction-search mode (M204). If the radio wave from the first communicating unit 30A fails to be received or if a seventh timeout occurs after the registration-notice from the first communicating unit 30A is received in the registration-search mode (M206), then the communication controller 32 changes its mode to the conjunction-search mode (M204).

If the button 34 receives the long press in the registration-search mode (M205), the communication controller 32 operates as the transmission-oriented unit. More specifically, the communication controller 32 changes its mode to a mobile-connection transmission mode (M208).

In the mobile-connection transmission mode, the communication controller 32 cyclically performs a wireless transmission (regular broadcasting) of a mobile-connection notice. The mobile-connection notice includes the second identification information, and information indicating that the notice in the transmission is the mobile-connection notice.

If the mobile-connection notice is received by the mobile device 100, then the mobile device 100 transmits the second mobile connection request. In response to receipt of the second mobile connection request from the mobile device 100, the communication controller 32 establishes a connection with the mobile device 100 and performs a data communication with the mobile device 100 (M209).

If the data communication with the mobile device 100 is completed or if the radio wave from the mobile device 100 fails to be received or if a eighth timeout occurs, then the communication controller 32 changes its mode to the wait-search mode (M203).

If the button 34 receives the short press or if a ninth timeout occurs in the mobile-connection transmission mode (M208), then the communication controller 32 changes its mode to the wait-search mode (M203). The ninth timeout means that a given time period elapses without receiving the second mobile connection request from the mobile device 100.

If the button 34 receives the extra-long press in the wait-search mode (M203) or in the conjunction-search mode (M204), then the communication controller 32 changes its mode to the deletion-search mode (M210). In the deletion-search mode, the communication controller 32 cyclically searches for the deletion-notice at the fourth interval Tin4 and for the fourth window Tw4. The communication controller 32 also flashes the third LED 35*c* during the deletion-search mode.

If the deletion-notice is delivered from the first communicating unit 30A in the deletion-search mode, then the communication controller 32 transmits the aforementioned second connection request to the first communicating unit 30A to thereby establish a connection with the first communicating unit 30A (M211). Once the connection with the first communicating unit 30A is established, the communication controller 32 executes the second deletion process (M211). In other words, the communication controller 32 deletes the first identification information from the memory 32*b* to thereby delete the registration of the first identification information (thus the registration of the first communicating unit 30A).

During the execution of the second deletion process, the communication controller 32 flashes the third LED 35*c* (M211). Once the second deletion process is completed, the communication controller 32 keeps the third LED 35*c* on (M212). The communication controller 32 then ends the connection with the first communicating unit 30A, completes the data communication, and changes its mode to the conjunction-search mode (M204).

If the button 34 receives the short press or if a tenth timeout occurs in the deletion-search mode (M210), then the communication controller 32 changes its mode to the conjunction-search mode (M204). If the radio wave from the first communicating unit 30A fails to be received or if a eleventh timeout occurs after the deletion-notice from the first communicating unit 30A is received in the deletion-search mode, then the communication controller 32 changes its mode to the conjunction-search mode (M204).

If the button 34 receives the extra-long press in the deletion-search mode (M210), then the communication controller 32 deletes registration of all of the registered identification information (M213). In a case where only the first identification information is registered, for example, the registration of only the first identification information is deleted. In a case where, in addition to the first identification information, an additional identification information of an additional communicating unit is registered, for example, not only the registration of the first identification information but also the registration of the additional identification information is deleted. During deletion of registration of all of the registered identification information (M213), the communication controller 32 turns on the third LED 35*c*. The communication controller 32 then changes its mode to the wait-search mode (M203) after the deletion of registration of all of the registered identification information. In a case where an additional communicating unit operating as the search-oriented unit exists in addition to the second communicating unit 30B, the additional communicating unit can perform a wireless communication with the first communicating unit 30A in a similar manner to the wireless communication with the second communicating unit 30B.

(1-6) Explanation of Communication Control Process

A communication control process executed by each of the communication controller 32 in the first communicating unit 30A and the communication controller 32 in the second communicating unit 30B will be explained next with reference to FIGS. 7A and 7B. The example operation shown in FIG. 5 is achieved by the communication controller 32 in the first communicating unit 30A executing the communication control process. The example operation shown in FIG. 6 is achieved by the communication controller 32 in the second communicating unit 30B executing the communication control process. In a case where the first communicating unit 30A is attached to the dust collector 50 and the second communicating unit 30B is attached to the electric power tool 1, the first communicating unit 30A operates in the same manner as the second communicating unit 30B attached to the dust collector 50 operates, the second communicating unit 30B operates in the same manner as the first communicating unit 30A attached to the electric power tool 1 operates.

The memory 32*b* stores a program for the communication control process. After activation, the communication controller 32 (more specifically, the CPU 32*a*) reads out the program of the communication control process from the memory 32*b* and executes the program. FIGS. 7A and 7B schematically show the communication control process for convenience of explanation. The operations exemplified in FIG. 5 and FIG. 6 are therefore partially omitted in FIGS. 7A and 7B.

The communication controller 32 executes an initial process in S110 once the communication control process begins. The initial process includes the aforementioned activation process to activate the communication circuit 31. In the initial process, the communication controller 32 determines which role of the transmission-oriented unit or the search-oriented unit the communication controller 32 takes on based on the role-determining information. In S110, the communication controller 32 turns on the third LED 35*c*.

In S120, the communication controller 32 determines which role of the transmission-oriented unit or the search-oriented unit the communication controller 32 takes on based on the determination result in the initial process in S110. If the communication controller 32 determines to take on the role of the transmission-oriented unit, then the process proceeds to S130. In S130, the communication controller 32 sets its mode to the wait-transmission mode. In response to the communication controller 32 being set in the wait-transmission mode, the communication controller 32 performs a regular transmission of the wait-notice at the first transmission cycle Ttr1. In S130, the communication controller 32 turns off all of the LEDs 35*a*, 35*b*, and 35*c*.

In S140, the communication controller 32 determines whether the button 34 receives the short press. If the communication controller 32 determines that the button 34 receives the short press, then the communication controller 32 sets its mode to the conjunction-transmission mode in S150. In response to the communication controller 32 being set in the conjunction-transmission mode, the communication controller 32 performs a regular transmission of the conjunction-notice at the second transmission cycle Ttr2. In S150, the communication controller 32 flashes or turns on the second LED 35*b* based on the machine-operational information.

In S160, the communication controller 32 determines whether a first condition is satisfied. The first condition is a condition for the communication controller 32 to return its mode to the wait-transmission mode from the conjunction-transmission mode. If the first condition is satisfied, then the process proceeds to S130. If the first condition is not satisfied, then the process proceeds to S170.

In S170, the communication controller 32 determines whether a second condition or a third condition is satisfied. The second condition is a condition for the communication controller 32 to change its mode from the conjunction-transmission mode to the registration-transmission mode. The second condition is satisfied in response to the button 34 receiving the long press, for example. The third condition is a condition for the communication controller 32 to change its mode from the conjunction-transmission mode to the deletion-transmission mode. The third condition is satisfied in response to the button 34 receiving the extra-long press, for example. If neither the second condition nor the third condition is satisfied, then the process proceeds to S150. If either the second condition or the third condition is satisfied, the process proceeds to S180.

In S180 the communication controller 32 changes its mode to the registration-transmission mode or to the deletion-transmission mode, depending on the condition that is satisfied in S170. In S180, the communication controller 32 also controls the display 35 in accordance with its changed mode. In addition, the communication controller 32 in the registration-transmission mode executes the first registration process in response to receipt of the first connection request; the communication controller 32 in the deletion-transmission mode executes the first deletion process in response to receipt of the second connection request. In response to a condition for the communication controller 32 to change its mode to the conjunction-transmission mode being satisfied when the communication controller 32 is in the registration-transmission mode or the deletion-transmission mode, the process proceeds to S150.

If the button 34 does not receive the short press in S140, then the process proceeds to S190. In S190, the communication controller 32 determines whether a fourth condition or a fifth condition is satisfied. The fourth condition is a condition for the communication controller 32 to change its mode from the wait-transmission mode to the registration-transmission mode. The fourth condition is satisfied in response to the button 34 receiving the long press, for example. The fifth condign is a condition for the communication controller 32 to change its mode from the wait-transmission mode to the deletion-transmission mode. The fifth condition is satisfied in response to the button 34 receiving the extra-long press. If neither the fourth condition nor the fifth condition is satisfied, then the process returns to S130. If either the fourth condition or the fifth condition is satisfied, then the process proceeds to S200. The process in S200 is the same as the process in S180.

In S120, if the communication controller 32 determines that the communication controller 32 takes on the role of the search-oriented unit, then the process proceeds to S210. In S210, the communication controller 32 sets its mode to the wait-search mode. The communication controller 32 cyclically searches for the wait-notice in response to the communication controller 32 being set in the wait-search mode. In S210, the communication controller 32 flashes the second LED 35*b*.

In S220, the communication controller 32 determines whether the conjunction-notice is received. If the conjunction-notice is received, then the communication controller 32 sets its mode to the conjunction-search mode in S230. In response to the communication controller 32 being set to the conjunction-search mode, the communication controller 32 cyclically searches for the conjunction-notice. In S230, the communication controller 32 flashes or turns on the second LED 35*b* based on the machine-operational information included in the received conjunction-notice. The communication controller 32 also transmits the conjunction command or stop command based on the machine-operational information included in the received conjunction-notice in S230.

In S240, the communication controller 32 determines whether a sixth condition is satisfied. The sixth condition is a condition for the communication controller 32 to return its mode to the wait-search mode from the conjunction-search mode. If the sixth condition is satisfied, then the process proceeds to S210. If the sixth condition is not satisfied, then the process proceeds to S250.

In S250, the communication controller 32 determines whether a seventh condition or an eighth condition is satisfied. The seventh condition is a condition for the communication controller to change its mode from the conjunction-search mode to the registration-search mode. The seventh condition is satisfied in response to the button 34 receiving the long press, for example. The eighth condition is a condition for the communication controller 32 to change its mode from the conjunction-search mode to the deletion-search mode. The eighth condition is satisfied in response to the button 34 receiving the extra-long press. If neither the seventh condition nor the eighth condition is satisfied, then the process returns to S230. If either the seventh condition or the eighth condition is satisfied, then the process proceeds to S260.

In S260, the communication controller 32 changes its mode to the registration-search mode or to the deletion-search mode, depending on the condition that is satisfied in S250. In S260, the communication controller 32 also controls the display 35 in accordance with the changed mode. In addition, the communication controller 32 in the registration-search mode executes the second registration process in response to receipt of the registration-notice; the communication controller 32 in the deletion-search mode executes the second deletion process in response to receipt of the deletion-notice. In response to a condition for the communication controller 32 to change its mode to the conjunction-search mode being satisfied when the communication controller 32 is in the registration-search mode or the deletion-search mode, the process proceeds to S230.

If the conjunction-notice is not received in S220, the process proceeds to S270. In S270, the communication controller 32 determines whether a ninth condition or a tenth condition is satisfied. The ninth condition is a condition for the communication controller 32 to change its mode from the wait-search mode to the registration-search mode. The ninth condition is satisfied in response to the button 34 receiving the long press, for example. The tenth condition is a condition for the communication controller 32 to change its mode from the wait-search mode to the deletion-search mode. The tenth condition is satisfied in response to the button 34 receiving the extra-long press, for example. If neither the ninth condition nor the tenth condition is satisfied, then the process returns to S210. If either the ninth condition or the tenth condition is satisfied, then the process proceeds to S280. The process in S280 is the same as the process in S260.

The first communicating unit 30A corresponds to an example of the communicator in the present disclosure and an example of the second additional communicator in the present disclosure. The second communicating unit 30B corresponds to an example of the communicator in the present disclosure and an example of the first additional communicator. The second communicating unit 30B corresponds to an example of the first additional communicator. The first electric working machine 1 (electric power tool 1) corresponds to an example of the transmission side electric working machine in the present disclosure. The second electric working machine 50 (dust collector 50) corresponds to an example of the receiving side electric working machine in the present disclosure. The saw blade 20 corresponds to an example of the tool of the transmission side electric working machine in the present disclosure. The fan 60 corresponds to an example of the tool of the receiving side electric working machine in the present disclosure. The motor 11 in the electric power tool 1 corresponds to an example of the driving device (the transmission side driving device) configured to drive the tool of the transmission side electric working machine in the present disclosure. The motor 51 in the dust collector 50 corresponds to the driving device (the receiving side driving device) configured to drive the tool of the receiving side electric working machine in the present disclosure. The connector 36 corresponds to an example of the connector in the present disclosure. The button 34 corresponds to an example of the manipulator on the present disclosure. The conjunction-transmission mode corresponds to an example of the operation-transmission mode in the present disclosure. The conjunction-search mode corresponds to an example of operation-receiving mode in the present disclosure. The wait-search mode corresponds to an example of the wait-receiving mode in the present disclosure. The registration-search mode corresponds to an example of the registration-receiving mode in the present disclosure. The deletion-search mode corresponds to an example of the deletion-receiving mode in the present disclosure. The second transmission cycle Ttr2 corresponds to an example of the first transmission cycle in the present disclosure. The first transmission cycle Ttr1, the third transmission cycle Ttr3, and the fourth transmission cycle Ttr4 correspond to an example of the second transmission cycle in the present disclosure. The second interval Tin2 in the conjunction-search mode corresponds to an example of the first monitoring cycle in the present disclosure. The first interval Tint in the wait-search mode corresponds to an example of the second monitoring cycle in the present disclosure. The machine-operational information corresponds to an example of the operational information in the present disclosure. The first identification information included in the registration-notice corresponds to an example of the first communicator information and the second communicator information in the present disclosure. The seven light-emitting patterns exemplified in FIG. 4 correspond to an example of the mode information and the driving information in the present disclosure.

2. Other Embodiments

Although one embodiment of present disclosure is as explained above, the present disclosure is not limited to the aforementioned embodiment and may be modified in various forms.

(2-1) The aforementioned four modes set in the transmission-oriented unit (the wait-transmission mode, the conjunction-transmission mode, the registration-transmission mode, and the deletion-transmission mode) are merely examples. The transmission-oriented unit may be set in any types of mode.

The aforementioned four modes set in the search-oriented unit (the wait-search mode, the conjunction-search mode, the registration-search mode, and the deletion-search mode) are merely examples. The search-oriented unit may be set in any types of mode.

(2-2) Two types of the role-determining information, the second power supply voltage Vc2 and the voltage of the ground line, are described in the aforementioned embodiment. These are also merely examples. There may be other role-determining information. The first communicating unit 30A and the second communicating unit 30B may operate or function in any manner in response to the role-determining information inputted. For example, there may be an additional device that includes a voltage-dividing circuit to divide the second power supply voltage Vc2 and transmits the divided voltage as role-determining information.

In this case, the first communicating unit 30A to which the divided voltage is delivered as the role-determining information may relay data communication between a device to which the first communicating unit 30A is attached, and an additional device. In this case, the first communicating unit 30A may perform data communication through the three data communication terminals 36e, 36f, and 36g between the first communicating unit 30A and the device to which the first communicating unit 30A is attached.

(2-3) In each of the first communicating unit 30A and the second communicating unit 30B, the communication controller 32 and the communication circuit 31 may be integrated.

In addition, the first communicating unit 30A may be included in the first electric working machine 1 as a built-in unit. The second communicating unit 30B may be included in the second electric working machine 50 as a built-in unit.

(2-4) In the aforementioned embodiment, the electric power tool 1 and the dust collector 50 were given as examples of the electric working machine. Nevertheless, the technique of the present disclosure may be applied to various jobsite electric apparatus equipped with electrically-driven tools including other types of electric working machines. Those jobsites may include a home carpentry site, a manufacturing site, a gardening site, and a construction site.

To be specific, the technique of the present disclosure may be applied to various electric working machines equipped with a tool, for example, electric power tools for stone processing, metal processing, or wood processing; machinery for gardening; and machinery for creating better jobsite environment. To be more specific, the technique of the present disclosure may be applied to various electric working machines such as electric hammers, electric hammer drills, electric drills, electric screwdrivers, electric wrenches, electric grinders, electric circular saws, electric reciprocating saws, electric jigsaws, electric cutters, electric chain saws, electric planers, electric nail guns (including riveting machines), electric hedge trimmers, electric lawn mowers, electric grass trimmers, electric bush cutters, electric cleaners, electric blowers, electric sprayers, electric spreaders, and electric dust collectors. Besides the electric working machines, the present disclosure may be applied to various jobsite electric apparatus equipped with tools driven by power supply, for example, jobsite lightings, and jobsite audio equipment such as radios and speakers. In addition, the present disclosure may also be applied to other jobsite electric apparatus such as battery packs mounted with batteries, and battery chargers for the batteries. In other words, various jobsite electric apparatus may be provided with the communicating unit in the present disclosure and may be configured to wirelessly transmit internal information of the jobsite electric apparatus additionally and may be conversely configured to wirelessly receive additional information and appropriately transmit the received additional information to the jobsite electric apparatus.

(2-5) Two or more functions achieved by one element of the aforementioned embodiment may be achieved by two or more elements; or one function achieved by one element may be achieved by two or more elements. In addition, two or more functions achieved by two or more elements may be achieved by one element; or one function achieved by two or more elements may be achieved by one element. Furthermore, a part of the configurations of the aforementioned embodiment may be omitted, and one element in any one of the embodiments may be added to or replaced with those of other embodiment.

What is claimed is:

1. An electric working machine comprising:
a driving device configured to drive a tool,
a communication circuit configured to perform wireless communication, and
a communication controller configured to cyclically transmit operational information via the communication circuit without specifying a recipient in response to an operating mode of the communication controller being set to an operation-transmission mode, the operational information indicating an operational state of the electric working machine.

2. A communicator comprising:
a connector configured to be electrically coupled to a transmission side electric working machine,
a communication circuit configured to perform wireless communication, and
a communication controller configured such that an operating mode of the communication controller is settable to an operation-transmission mode in response to the connector being coupled to the transmission side electric working machine, the communication controller being further configured to cyclically transmit operational information via the communication circuit without specifying a recipient in response to the operating mode being set to the operation-transmission mode, the operational information indicating an operational state of the transmission side electric working machine.

3. The communicator according to claim 2,
wherein the operational information indicates a driving state of a tool of the transmission side electric working machine.

4. The communicator according to claim 2, further comprising a manipulator configured to be manipulated by a user of the communicator,
wherein the communication controller is further configured to change the operating mode in response to a manipulation being performed on the manipulator.

5. The communicator according to claim 2,
wherein the communication controller is further configured to cyclically transmit different information corresponding to the operating mode of the communication controller via the communication circuit, the different information varying depending on the operating mode.

6. The communicator according to claim 2, further comprising a display that is configured to show information,
wherein the communication controller is further configured to show mode information on the display, the mode information including information to identify whether the operating mode is set to the operation-transmission mode.

7. The communicator according to claim 2,
wherein the communication controller is further configured to cyclically transmit the operating information at a first transmission cycle in response to the operating mode being set to the operation-transmission mode, and
wherein the communication controller is further configured to cyclically transmit given information at a second transmission cycle, different from the first transmission cycle, in response to the operating mode being set to a given transmission mode different from the operation-transmission mode, the given information being information specific to the given transmission mode.

8. The communicator according to claim 7,
wherein the first transmission cycle is shorter than the second transmission cycle.

9. The communicator according to claim 2,
wherein the communication controller is further configured to cyclically transmit registration information via the communication circuit in response to the operating mode being set to a registration-transmission mode, the registration information including a command directed to a first additional communicator to conduct a registration of first communicator information that identifies the communicator.

10. The communicator according to claim 9,
wherein the communication controller is further configured to cyclically transmit deletion information via the communication circuit in response to the operating mode being set to a deletion-transmission mode, the deletion information including a command directed to the first additional communicator to delete the registration of the first communicator information.

11. The communicator according to claim 2,
wherein the connector is further configured to be electrically coupled to a receiving side electric working machine,
wherein the communication controller is further configured such that the operating mode is settable to an operation-receiving mode in response to the connector being coupled to the receiving side electric working machine,
wherein the communication controller is further configured to cyclically monitor, at a first monitoring cycle, whether the operational information is received via the communication circuit, in response to the operating mode being set to the operation-receiving mode, and
wherein the communication controller in the operation-receiving mode is further configured to output the operational information received.

12. The communicator according to claim 11,
wherein the operational information indicates a driving state of a tool of the transmission side electric working machine.

13. The communicator according to claim 11,
wherein the communication controller is further configured to cyclically monitor, at a second monitoring cycle, information received via the communication circuit in response to the operating mode being set to a wait-receiving mode, and
wherein the communication controller in the wait-receiving mode is further configured to change the operating mode to the operation-receiving mode in response to a reception of the operational information via the communication circuit.

14. The communicator according to claim 13, wherein the first monitoring cycle is shorter than the second monitoring cycle.

15. The communicator according to claim 13,
wherein the operational information is transmitted from a second additional communicator,
wherein the second additional communicator is configured to transmit second communicator information that identifies the second additional communicator,
wherein the communication controller is further configured to conduct a registration of the second communicator information received via the communication circuit in response to the operating mode being set to a registration-receiving mode, and
wherein the communication controller in the wait-receiving mode is further configured to change the operating mode to the operation-receiving mode in response to a reception of the operational information and the second communicator information, registered in the communication controller, via the communication circuit.

16. The communicator according to claim 15,
wherein the communication controller is further configured to delete the registration of the second communicator information based on given deletion information received via the communication circuit in response to the operating mode being set to a deletion-receiving mode.

17. The communicator according to claim 12, further comprising a display that is configured to show information,
wherein the communication controller is further configured to show driving information on the display based on the operational information received via the communication circuit, the driving information including information to identify whether the tool is being driven.

18. The communicator according to claim 2,
wherein the connector is configured to be detachably coupled to the transmission side electric working machine.

19. The communicator according to claim 2 further comprising:
an attachment portion configured to allow detachable attachment of the transmission side electric working machine.

20. The communicator according to claim 2,
wherein the connector is configured to receive, from the transmission side electric working machine, a communication power for operating the communication controller, and
wherein the communication power is generated in the transmission side electric working machine from an operating power inputted into the transmission side electric working machine for operating the transmission side electric working machine.

21. The communicator according to claim 2,
wherein the communication controller is configured to cyclically but not continuously transmit the operational information.

22. The communicator according to claim 2,
wherein the communication controller is configured to intermittently transmit the operational information.

23. The communicator according to claim 2,
wherein the communication controller is configured to receive a signal which instructs the communication controller to avoid transmission of the operational information in response to the operating mode being set to a first mode.

24. The electric working machine according to claim 1 further comprising:
a communicator including:
the communication circuit; and
the communication controller; and
a connector configured to detachably couple to the communicator.

25. The electric working machine according to claim 1 further comprising:
a communicator including:
the communication circuit; and
the communication controller; and
an attachment portion configured to allow detachable attachment of the communicator.

26. The electric working machine according to claim 1 further comprising:
a power receiver configured to receive a drive power for driving the driving device; and
a power source configured to generate, from the drive power received by the power receiver, a communication power for operating the communication controller.

27. The electric working machine according to claim 1,
wherein the communication controller is configured to cyclically but not continuously transmit the operational information.

28. The electric working machine according to claim 1,
wherein the communication controller is configured to intermittently transmit the operational information.

29. The electric working machine according to claim 1,
wherein the communication controller is configured to receive a signal which instructs the communication controller to avoid transmission of the operational information in response to the operating mode being set to a first mode.

30. A communication method comprising:
setting an operating mode of a communicator to an operation-transmission mode in response to the communicator being electrically coupled to an electric working machine, and
cyclically transmitting operational information from the communicator without specifying a recipient in response to the operating mode being set to the operation-transmission mode, the operational information indicating an operational state of the electric working machine.

31. The communication method according to claim 30,
wherein cyclically transmitting operational information from the communicator without specifying a recipient in response to the operating mode being set to the operation-transmission mode includes cyclically but not continuously transmitting the operational information from the communicator, the operational information indicating an operational state of the electric working machine.

32. The communication method according to claim 30,
wherein cyclically transmitting operational information from the communicator without specifying a recipient in response to the operating mode being set to the operation-transmission mode includes intermittently transmitting the operational information from the communicator, the operational information indicating an operational state of the electric working machine.

33. The communication method according to claim 30, further comprising:

receiving, at the communicator, a signal which instructs the communicator to avoid transmission of the operational information in response to the operating mode being set to a first mode.

* * * * *